Jan. 30, 1951     W. F. CARAHER     2,539,725
BALE AND METHOD OF MAKING SAME
Filed Dec. 19, 1945     2 Sheets-Sheet 1
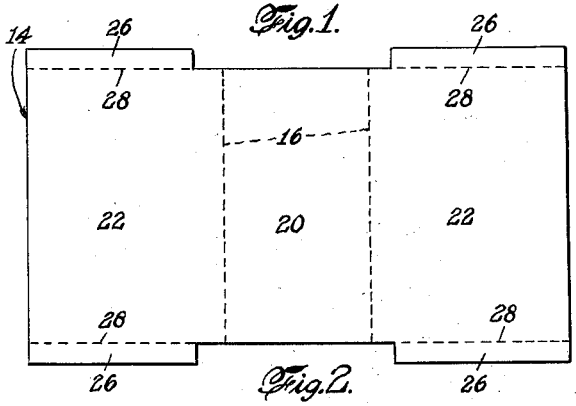
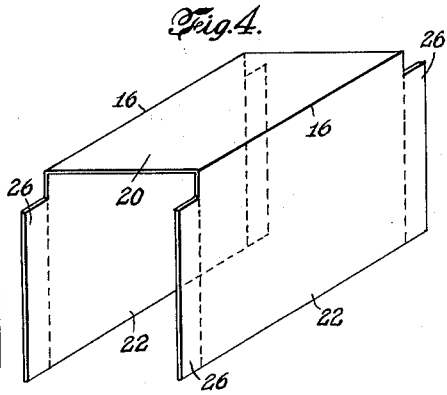
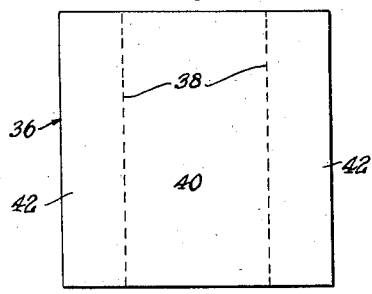
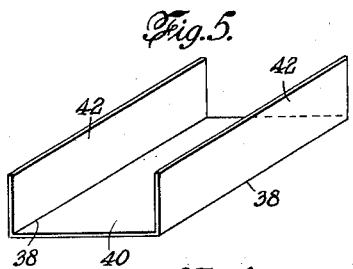
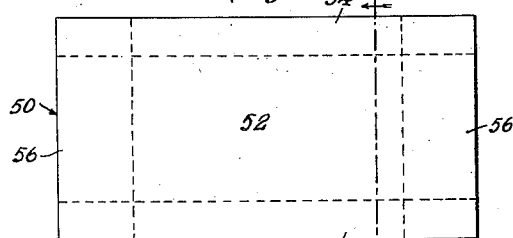
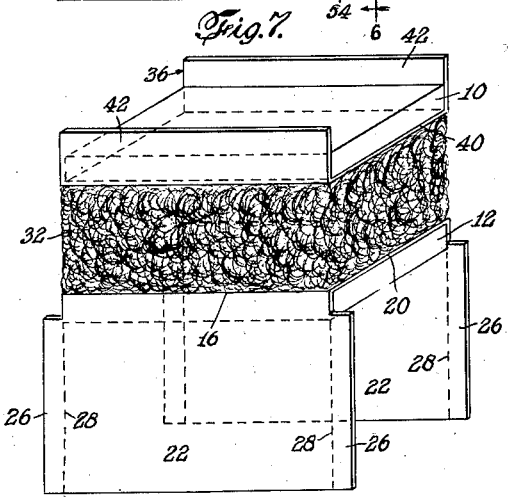
INVENTOR.
WILLIAM F. CARAHER
BY
ATTORNEY.

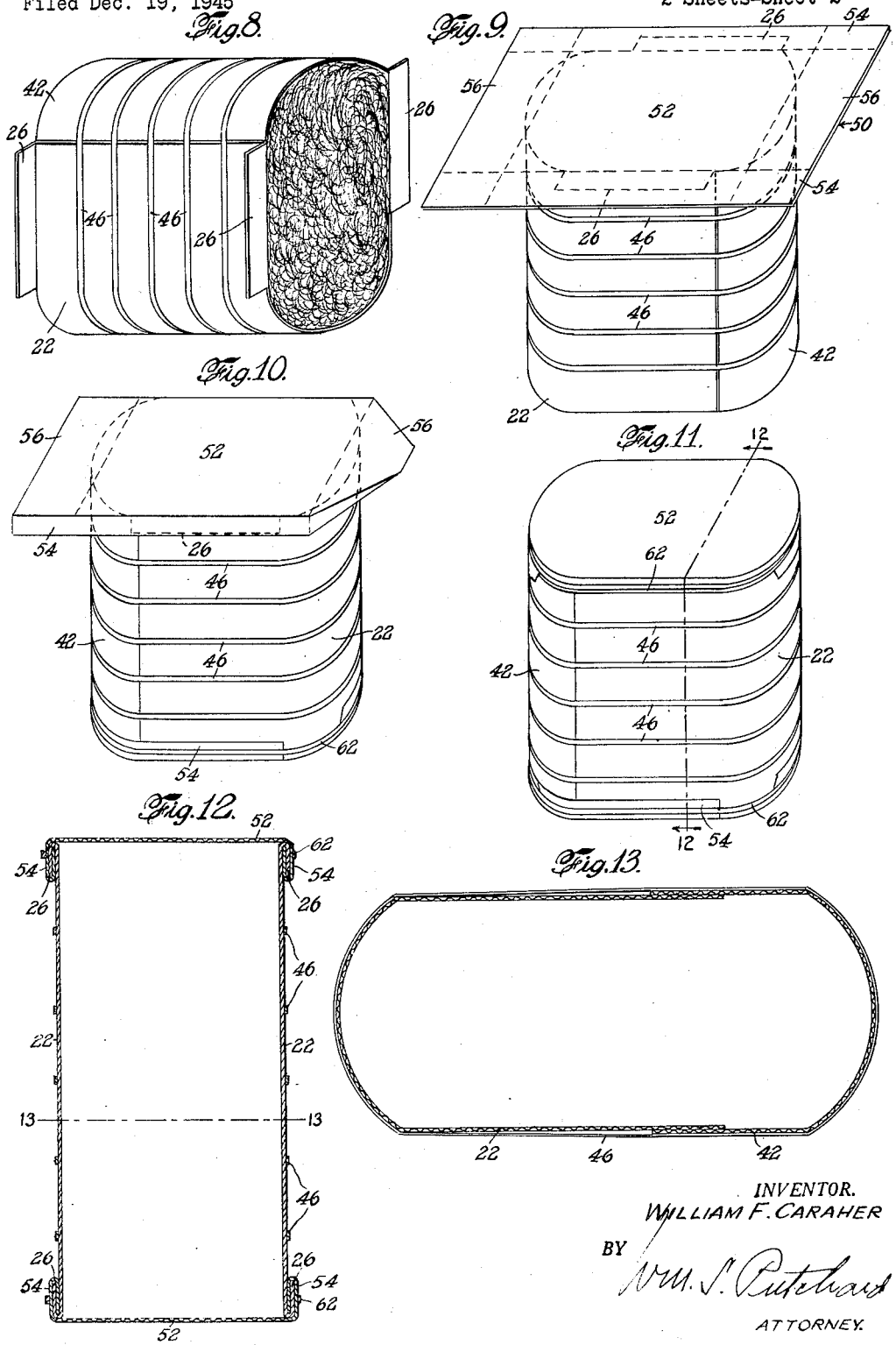

Patented Jan. 30, 1951

2,539,725

UNITED STATES PATENT OFFICE 2,539,725

BALE AND METHOD OF MAKING SAME

William F. Caraher, Richmond, Va., assignor to E. I. du Pont de Nemours & Company, Wilmington, Del., a corporation of Delaware Application December 19, 1945, Serial No. 635,892

4 Claims. (Cl. 100—14)

This invention relates to a new and improved bale, and to the method of packaging the same. More particularly, it relates to a new and improved staple rayon bale wrap, and to the method of preparing the same.

One of the standard balers on the market has a fixed bed and a movable head which applies pressure to the material to be baled. The baler also has two hinged side pieces which can be locked into place during the pressing operation but which, after the bale has been pressed to the proper density, can be swung out of the way. The two ends of the baler are closed and contain the working mechanism of the baler, thereby making the ends of the baler inaccessible for packaging the bale. Thus, the bale has to be removed from the baler before the bale can be completely packaged. Due to the nature of staple rayon, it is not possible to compress it in the baler, remove it from the baler, and package it in a carton or the like. The conventional type of package, such as a carton or box, cannot be used in the baler for the baling of staple rayon, which, due to its fluffiness, requires several press-ups to bring it to the proper density. The ends of the baler do not permit a closed container to be used, and there is no way of putting a lid or cap on a carton while it is under pressure and, if the pressure is removed to put on a lid, the bale expands and loses its density, with the result that packaging thereof is impossible.

Attempts have been made in the baling of staple rayon to partially package the bale in the baler before the pressure was removed. However, in such a packaging operation, if a rigid covering such as corrugated board or fiberboard were desired, after the bale had been partially packaged and the straps applied and the pressure removed, the height of the bale expanded approximately 30% and in so expanding each end of the bale assumed a curved surface. Up to the present invention, no satisfactory cap for sealing the ends had been found. Corrugated board or like rigid material cannot be used for the reason that it cannot be scored for circular surfaces.

An object of this invention is to provide a new and improved bale wrap.

Another object of this invention is to provide a bale wrap utilizing corrugated board or like material.

An additional object of this invention is to provide a bale wrap having new and improved end caps.

A still further object of this invention is to provide a bale wrap having end caps which can be formed to conform to the curved ends to produce a bale of smooth, uniform appearance.

Other and additional objects will become apparent hereinafter.

The objects of this invention are accomplished, in general, by wrapping the top and bottom and the opposite sides of the bale, while in the baler, with a top member and a bottom member folded to conform to the surfaces of the bale to which they are applied, with the free ends thereof in overlapping relationship on opposite sides of the bale to form the side walls of the wrap, whereby when the partially wrapped bale is removed from the baler and the bale expands, the overlapping ends of the top and bottom members will slide relative to each other an amount commensurate with the expansion. Before the bale is removed from the baler, straps are placed around the sides, top and bottom of the bale. During the expansion, the ends of the bale assume the curved surfaces. A cap, of the type hereinafter more fully explained, is positioned on each end of the bale and secured thereto.

Each of the caps, in one embodiment of the invention, is formed of corrugated board having integral flaps of a flexible material at the opposite side edges and at the opposite ends. Each of the flaps at the side edges of the cap is interlocked with a flap provided on the bottom member adjacent the portion thereof which forms a part of the side wall. The flaps at the opposite ends of the cap are folded around the curved surfaces and tucked under with an envelop fold. Each cap is held in place by a strap. After one end has been capped, as previously described, the bale is up-ended and a cap applied to the opposite end.

The details and manner of practicing the invention will become more apparent upon reference to the following description when taken in conjunction with the accompanying drawings, wherein:

Figure 1 is a top plan view of a bottom member which is to be disposed about the bottom and on opposite sides of the bale;

Figure 2 is a top plan view of a top member which is to be disposed about the top and on the opposite sides of the bale;

Figure 3 is a top plan view of an end cap;

Figure 4 is a perspective view of the bottom member as it appears at one stage in the baler;

Figure 5 is a perspective view of the top member as it appears in one stage in the baler;

Figure 6 is a section taken on line 6—6 of Figure 3;

Figure 7 is a diagrammatic perspective view illustrating one of the stages of the baling operation;

Figure 8 is a perspective view of the partially wrapped bale after removal from the baler;

Figure 9 illustrates one stage in the applying of an end cap;

Figure 10 is a perspective view illustrating another stage of the applying of an end cap;

Figure 11 is a perspective view of the wrapped bale;

Figure 12 is a section taken on line 12—12 of Figure 11, with the contents of the bale being omitted for the purpose of convenience and clarity; and Figure 13 is a section taken on line 13—13 of Figure 12.

Referring to the drawings wherein like reference numerals designate like parts, the reference numerals 10 and 12 designate the movable head and stationary bed, respectively, of a standard known baler. Since the details of construction of the baler form no part of the invention, no further description thereof is deemed necessary.

On the baler bed, there is positioned a bottom member, generally designated by the reference numeral 14. As shown in Figure 1, the bottom member 14 comprises a blank formed of corrugated board which is scored along the parallel spaced lines 16 to provide a panel 20 having a panel 22 on each side thereof. As will hereinafter appear, the panel 20 will be positioned on the bottom of the bale, and the panels 22 disposed on the respective opposite sides of the bale. For reasons which will become apparent, each of the panels 22 is provided with opposite side flaps 26, and each of the flaps 26 is adapted to be folded on the score lines 28. The bottom member 14 is folded into the inverted U form shown in Figure 4 and is disposed in the baler with the panel 20 positioned on the baler bed 12, the panels 22 extending downwardly on opposite sides thereof. Each flap 26 is preferably folded on the score line 28 onto the panel 22 to which it is attached. Alternatively, the bottom member 14 is positioned on the baler bed 12 and while so positioned folded into the inverted U shape.

After the bottom member 14 has been positioned as above described in the baler, the hinged side members of the standard baler are positioned around the bale and locked in place to form the press chamber. Staple rayon is introduced into the press chamber and the baler head 10 actuated to compress the staple, generally designated by the reference numeral 32, until it has been compressed to the desired density. Due to the fluffiness of the staple, it is necessary to fill the press chamber and press it several times before the bale is of proper weight. Before the last press-up, the top member, generally designated by the reference numeral 36, is positioned on the bale head 10, as will now be described.

The top member 36, as shown in Figure 2, comprises a blank which is scored along the spaced parallel lines 38. As will hereinafter appear, the panel 40 produced intermediate the score lines 38 will be positioned on the top of the bale, and the panels 42 disposed on the respective opposite sides of the bale. The top member is folded into U shape, as shown in Figure 5, and in this position it is disposed on the bale head 10, the bale head 10 being positioned between the panels 42 and on top of the panel 40, as shown in Figure 7. Alternatively, the bale head 10 can be positioned on top of the top member 36 and the latter folded into the U shape previously described.

After the top member 36 has been positioned in place, as just described, the final press-up is made and the bale held under pressure. The sides of the baler are then opened and swung out of the way. The panels 42 are then bent downwardly 180° and positioned on the respective sides of the bale. The panels 22 are folded upwardly 180° and also positioned on the respective sides of the bale.

The length of the panels 22 and panels 42 is such that, when in position on the sides of the bale, they are in overlapping relationship.

The flaps 26 are folded so that they will be perpendicular to the panels 22 and extend outwardly.

While the bale is still maintained under pressure in the baler, a plurality of steel straps 46 are placed around the sides, top and bottom of the bale, the head and bed of the baler being provided with spaced slots through which the straps are slipped to permit application of the straps to the bale. After the straps 46 have been sealed, the pressure is removed from the bale. The depth of the bale expands but, because panels 22 overlap on panels 42, the top and bottom members slide with the expanding depth of the bale and conform to the expanded size and shape of the bale. It is to be noted that even after the bale has expanded to its ultimate size, the panels 22 still overlap onto the panels 42 to constitute side walls of the wrap and also make a substantially continuous surface of the bale-wrapping material around the two sides, top and bottom of the bale. The partially wrapped bale is shown in Figure 8.

The bale is then removed from the baler and stood on end, as shown in Figure 9. An end cap 50 is applied to the exposed end and, after the end cap has been applied and secured, the bale is reversed and a similar end cap is applied to the other end.

As shown in Figure 6, the end cap comprises a blank of corrugated board 52 having integrally formed therewith side flaps 54 and end flaps 56, each of said flaps being formed of a flexible material, such as kraft paper.

As shown in Figure 9, an end cap 50 is positioned on the end of the partially wrapped bale, in which the flaps 26 extend outwardly and on which the side flaps 54 of the end cap are disposed. Each end cap flap 54 is then infolded under the respective flap 26 and then downwardly onto the side wall of the bale wrap, whereby flap 26 is interlocked. The extensions of the folded flap 54 and the end flap 56 are folded around the curved surfaces of the bale, and the ends 56 are tucked under with an envelop fold. A steel strap 62 secures the cap in position. The bale is then up-ended and the other cap is positioned on the other end in a similar manner. Thus, the bale is completely covered and the caps are securely locked and held in position.

In the preferred embodiment of the invention, the top and bottom pieces are formed of a substantially rigid material, such as corrugated board. It is, of course, to be understood that the bale wrap, and particularly the top and bottom members, do not necessarily have to be formed of corrugated board. They may be made of any suitable material or combination of materials and, irrespective of the nature of the material, can be made waterproof or even moistureproof.

In the preferred form, the caps are of the special construction, i. e. the flaps are formed of a flexible material integral with the corrugated board. Such material can be made by adhesively securing a corrugated sheet of paper between two sheets of kraft paper, the sheets of kraft paper being coextensive and of such a size that they will produce the necessary side and end flaps. Instead of kraft paper, other flexible sheet material can be used. It is, of course, to be understood that the caps 50 are not restricted to the specific construction hereinbefore described. If desired, corrugated board may be secured to a sheet of kraft paper or other flexible material, provided that the paper (or other flexible material) and corrugated board are of sufficient relative dimensions to provide the side flaps and end flaps which are necessary to produce the folds previously described. In this latter embodiment, instead of utilizing corrugated board, solid materials, such as fiberboard, sheet plastic and the like, can be used.

The invention, as shown by the previous description, in its preferred form is adapted for use with bales of staple, but is not restricted thereto. It is applicable to any article which is baled and which expands after the pressure of the baler is removed. It can also be used for packaging of any circular article in corrugated board.

The instant invention provides a bale wrap of an unstretchable material which is so constructed that it will take up the expansion of the compressed material after the baling pressure has been removed. The bale wrap also provides end caps having flaps which can be folded and formed around curved surfaces. Because of such construction, the wrap can be made of corrugated board or similar rigid material, which presents a clean, smooth surface on which information can be stencilled, printed, or otherwise written. When corrugated board constitutes the wrapping material of the bale, it discourages the use of stevedore hooks and similar instruments which burlap and similar material seem to invite.

Since it is obvious that many changes and modifications can be made in the above-described details without departing from the nature and spirit of the invention, it is to be understood that the invention is not to be limited thereto except as set forth in the appended claims.

I claim:

1. A bale having curved top and bottom surfaces packaged in an outer covering, which comprises a top member disposed on the top of said bale and having opposite side wall panels attached thereto which are disposed on the opposite sides of said bale, a bottom member disposed on the bottom of said bale and having opposite side wall panels attached thereto which are disposed on the opposite sides of said bale, the side wall panels of the bottom member being disposed in overlapping relationship on the side wall panels of the top member, straps passing about said top and bottom members to maintain the same in position, said bottom member having a flap at each end of each of the side wall panels, a cap on each end of said bale, each of said caps having a flap at the opposite edges and on the opposite ends thereof, each of the edge flaps being folded to interlock with the flap on the side wall adjacent thereto and each of the flaps at the opposite ends of said cap members being folded to conform to the shape of the bale adjacent thereto and tucked under with an envelop fold, and a strap passing over said folded flaps and envelop folds of said cap.

2. A bale having curved top and bottom surfaces packaged in an outer covering, which comprises a top member disposed on the top of said bale and having opposite side wall panels attached thereto which are disposed on the opposite sides of said bale, a bottom member disposed on the bottom of said bale and having opposite side wall panels attached thereto which are disposed on the opposite sides of said bale, the side wall panels of the bottom member being disposed in overlapping relationship on the side wall panels of the top member, straps passing about said top and bottom members to maintain the same in position, said bottom member having a flap at each end of each of the side wall panels, a cap on each end of said bale, each of said caps having a flexible paper flap on opposite edges thereof and a flexible paper flap on the opposite ends, each of said flaps being folded to interlock with the flap on the side wall adjacent thereto and each of the flaps at opposite ends of each of said cap members being folded to conform to the shape of the bale adjacent thereto and tucked under with an envelop fold, and a strap passing over said folded flaps and envelop folds of said cap.

3. A bale having curved top and bottom surfaces packaged in an outer covering, which comprises a top member disposed on the top of said bale and having opposite side wall panels attached thereto which are disposed on the opposite sides of said bale, a bottom member disposed on the bottom of said bale and having opposite side wall panels attached thereto which are disposed on the opposite sides of said bale, the side wall panels of the bottom member being disposed in overlapping relationship on the side wall panels of the top member, said top and bottom members being formed of corrugated board, straps passing about said top and bottom members to maintain the same in position, said bottom member having a flap at each end of each of the side wall panels, a cap on each end of said bale, each of said caps having integrally formed therewith a flexible material of a size to provide a flexible flap on opposite edges thereof and a flexible flap on the opposite ends, each of said flaps being folded to interlock with the flap on the side wall adjacent thereto and each of the flaps at opposite ends of each of said cap members being folded to conform to the shape of the bale adjacent thereto and tucked under with an envelop fold, and a strap passing over said folded flaps and envelop folds of said cap.

4. In a method of baling staple rayon, the steps which comprise partially packaging the baled material, while under baling pressure, in top and bottom members, the top member extending over the top of the bale and having side wall panels disposed on the opposite side walls of the bale and the bottom member extending over the bottom of the bale and having side wall panels on the opposite side walls in overlapping relationship with respect to the respective side wall panels of the top member, applying spaced straps around the top, bottom and side walls, releasing the baling pressure whereby the staple rayon expands and the side wall panels slide with respect to each other to take up said expansion, disposing an end cap blank having flexible edge and end flaps on an end of the partially wrapped bale with the edge flaps in cooperative position relative to flaps on the ends of the wall panels of the bottom member, interlocking said flaps, folding the end flaps of the cap blank to conform to the surface of the bale, tucking under said end flaps with an envelop fold, and securing the end cap in place with a strap.

WILLIAM F. CARAHER.

REFERENCES CITED

The following references are of record in the file of this patent:

UNITED STATES PATENTS

| Number | Name | Date |
| --- | --- | --- |
| 918,964 | Chapin | Apr. 20, 1909 |
| 1,150,076 | Stokes | Aug. 17, 1915 |
| 1,552,129 | Felton | Sept. 1, 1925 |
| 1,846,585 | Clark | Feb. 23, 1932 |

FOREIGN PATENTS

| Number | Country | Date |
| --- | --- | --- |
| 23,307 | Great Britain | of 1900 |